United States Patent [19]

Mueller et al.

[11] Patent Number: 5,704,038
[45] Date of Patent: Dec. 30, 1997

[54] POWER-ON-RESET AND WATCHDOG CIRCUIT AND METHOD

[75] Inventors: Donald L. Mueller, Centerville, Ohio; Benjamin L. Miciano, El Paso, Tex.

[73] Assignee: ITT Automotive Electrical Systems, Inc., Auburn Hills, Mich.

[21] Appl. No.: 632,328

[22] Filed: Apr. 17, 1996

Related U.S. Application Data

[63] Continuation of Ser. No. 316,246, Sep. 30, 1994, abandoned.

[51] Int. Cl.$^6$ .................................................. G06F 11/30
[52] U.S. Cl. ................................. 395/185.08; 371/61
[58] Field of Search .................. 395/185.08, 185.09; 371/61, 62

[56] References Cited

U.S. PATENT DOCUMENTS

| | | | |
|---|---|---|---|
| Re. 33,308 | 8/1990 | Millerd et al. | 318/444 |
| Re. 33,848 | 3/1992 | Shiraishi | 318/444 |
| 3,864,578 | 2/1975 | Lackey | 307/10 R |
| 4,055,772 | 10/1977 | Leung | 307/10 R |
| 4,075,501 | 2/1978 | Kondo | 307/41 |
| 4,091,317 | 5/1978 | Roszyk et al. | 318/369 |
| 4,314,186 | 2/1982 | Gille et al. | 318/434 |
| 4,320,329 | 3/1982 | Gille et al. | 318/443 |
| 4,355,270 | 10/1982 | Cooke et al. | 318/443 |
| 4,388,574 | 6/1983 | Bois et al. | 318/443 |
| 4,527,105 | 7/1985 | Shiraishi | 318/444 |
| 4,553,200 | 11/1985 | Sibley | 395/183.1 |
| 4,578,591 | 3/1986 | Floyd et al. | 307/10 R |
| 4,584,487 | 4/1986 | Hesse et al. | 307/10 R |
| 4,611,154 | 9/1986 | Lambropoulos | 318/490 |
| 4,663,575 | 5/1987 | Juzswik et al. | 318/444 |
| 4,689,535 | 8/1987 | Tsunoda et al. | 318/443 |
| 4,705,998 | 11/1987 | Millerd et al. | 318/444 |
| 4,825,134 | 4/1989 | Tracht | 318/443 |
| 4,851,745 | 7/1989 | Ponziani | 318/443 |
| 4,916,374 | 4/1990 | Schierbeek et al. | 318/483 |
| 4,942,349 | 7/1990 | Millerd et al. | 318/483 |
| 4,961,033 | 10/1990 | Hirota | 318/560 |
| 5,030,899 | 7/1991 | Nishibe et al. | 318/444 |
| 5,057,754 | 10/1991 | Bell | 318/483 |
| 5,081,625 | 1/1992 | Rhee et al. . | |
| 5,086,260 | 2/1992 | Ito | 318/266 |
| 5,117,168 | 5/1992 | Nomura et al. | 318/444 |
| 5,119,002 | 6/1992 | Kato | 318/444 |
| 5,123,018 | 6/1992 | Peterson . | |
| 5,140,234 | 8/1992 | Wallrafen | 318/264 |
| 5,200,676 | 4/1993 | Mueller et al. | 318/444 |
| 5,216,341 | 6/1993 | Nomura et al. | 318/444 |
| 5,233,613 | 8/1993 | Allen et al. | 395/185.08 |
| 5,235,260 | 8/1993 | Furukoshi | 318/443 |
| 5,239,244 | 8/1993 | Teder | 318/444 |
| 5,285,138 | 2/1994 | Okada | 318/280 |
| 5,304,936 | 4/1994 | Buschur | 324/689 |
| 5,404,085 | 4/1995 | Resch et al. | 318/443 |
| 5,412,296 | 5/1995 | Chien et al. | 318/444 |
| 5,563,799 | 10/1996 | Brehmer et al. | 364/481 |

*Primary Examiner*—Robert W. Beausoliel, Jr.
*Assistant Examiner*—P. Vales
*Attorney, Agent, or Firm*—J. Gordon Lewis; Thomas N. Twomey

[57] ABSTRACT

A power-on-reset and watchdog circuit is disclosed which employs discrete bipolar transistors to provide reset capability for microprocessors in the event of power-up or microprocessor malfunction. The present invention has a watchdog detection circuit which monitors a pulsed microprocessor output signal. As long as the watchdog detection circuit receives the pulsed microprocessor output signal, the microprocessor will not reset. In the event of microprocessor malfunction the pulsed microprocessor output signal will latch either high or low, initiating an oscillator circuit to reset the microprocessor. Upon power-up, the watchdog detection circuit will be forced into the off state for a specified amount of time so as to invoke the oscillator circuit, thereby resetting the microprocessor.

23 Claims, 2 Drawing Sheets

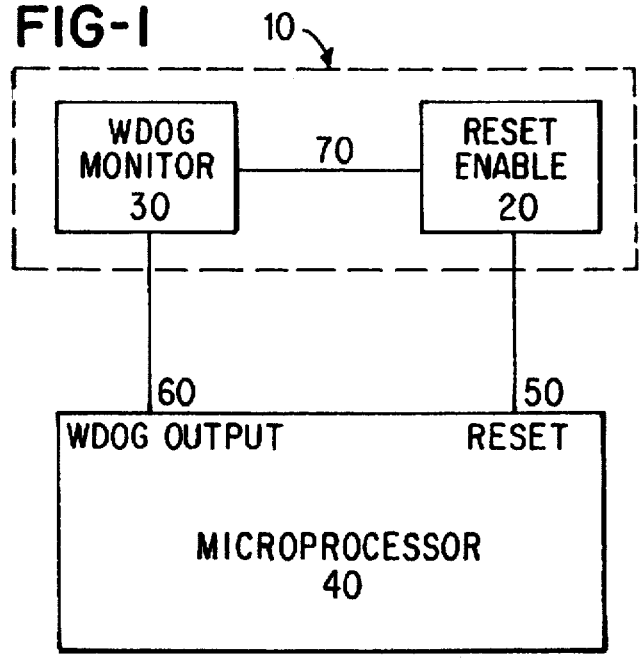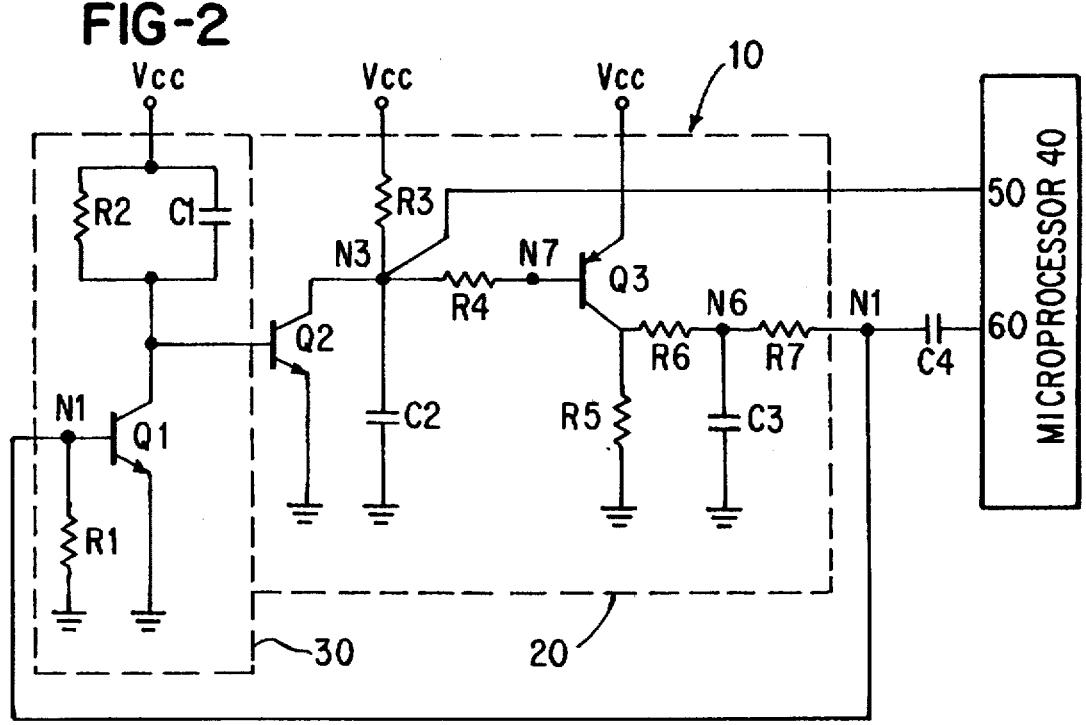

5,704,038

POWER-ON-RESET AND WATCHDOG CIRCUIT AND METHOD

This is a continuation of Ser. No. 08/316,246 filed Sep. 30, 1994, now abandoned.

BACKGROUND OF THE INVENTION

The present invention relates to a power-on-reset and watchdog circuit for microcomputer applications, and more particularly to a low cost and compact power-on-reset and watchdog circuit using discrete bipolar transistors.

Reset circuits are commonly employed in microprocessor applications to reset the microprocessor during either a power up initialization or a microprocessor malfunction. Reset circuits transmit a signal to a microprocessor reset line to reset the microprocessor. However, the prior art reset circuits typically employ logic gates in integrated circuit form, such as dual-in-line or single-in-line chips. One such logic gate typically employed is a Schmitt Trigger which uses commercially available logic gates, commonly found in the TO82 or similar dual-in-line package. A problem with using these types of integrated circuits is that they consume relatively large amounts of space on a circuit board which, in turn, presents design and manufacturing difficulties for applications having tight space constraints. Also, employing these types of logic gates is relatively expensive. In high sales volume industries, such as the automotive industry, such incremental cost savings may translate into sizable long term savings and economic advantage.

A need therefore exists for a low cost and compact reset circuit for microprocessor applications.

SUMMARY OF THE INVENTION

Accordingly, it is a primary object of the present invention to provide a low cost method and circuit for resetting a microprocessor during power up initialization or in the event of microprocessor malfunction.

Another object of the present invention is to provide a method and circuit for resetting a microprocessor that facilitates reducing the use of expensive constituent components and minimizing the space consumed by the circuit.

According to one aspect of the invention, a power-on-reset and watchdog circuit for a microprocessor having a reset line and a watchdog output line comprises monitor means for monitoring the watchdog output line and for generating a reset signal in response to a malfunction signal generated by the microprocessor on the watchdog output line.

According to another aspect of the present invention, a method is disclosed for resetting a microprocessor, including the steps of: generating a microprocessor error signal in a microprocessor having a reset terminal; configuring a watchdog circuit to receive the microprocessor error signal and to generate a reset enable signal responsive thereto, wherein the watchdog circuit comprises a plurality of transistors; and resetting the microprocessor in response to the reset enable signal.

The above, and other objects, features and advantages of the present invention will become apparent from the following description read in conjunction with the accompanying drawings, in which like reference numerals designate the same elements.

BRIEF DESCRIPTION OF THE DRAWING

FIG. 1 is a block diagram of a power-on-reset and watchdog circuit of the present invention;

FIG. 2 is a circuit diagram illustrating one embodiment of a power-on-reset and watchdog circuit of the present invention.

DETAILED DESCRIPTION OF THE PREFERRED EMBODIMENT

Figure 3:
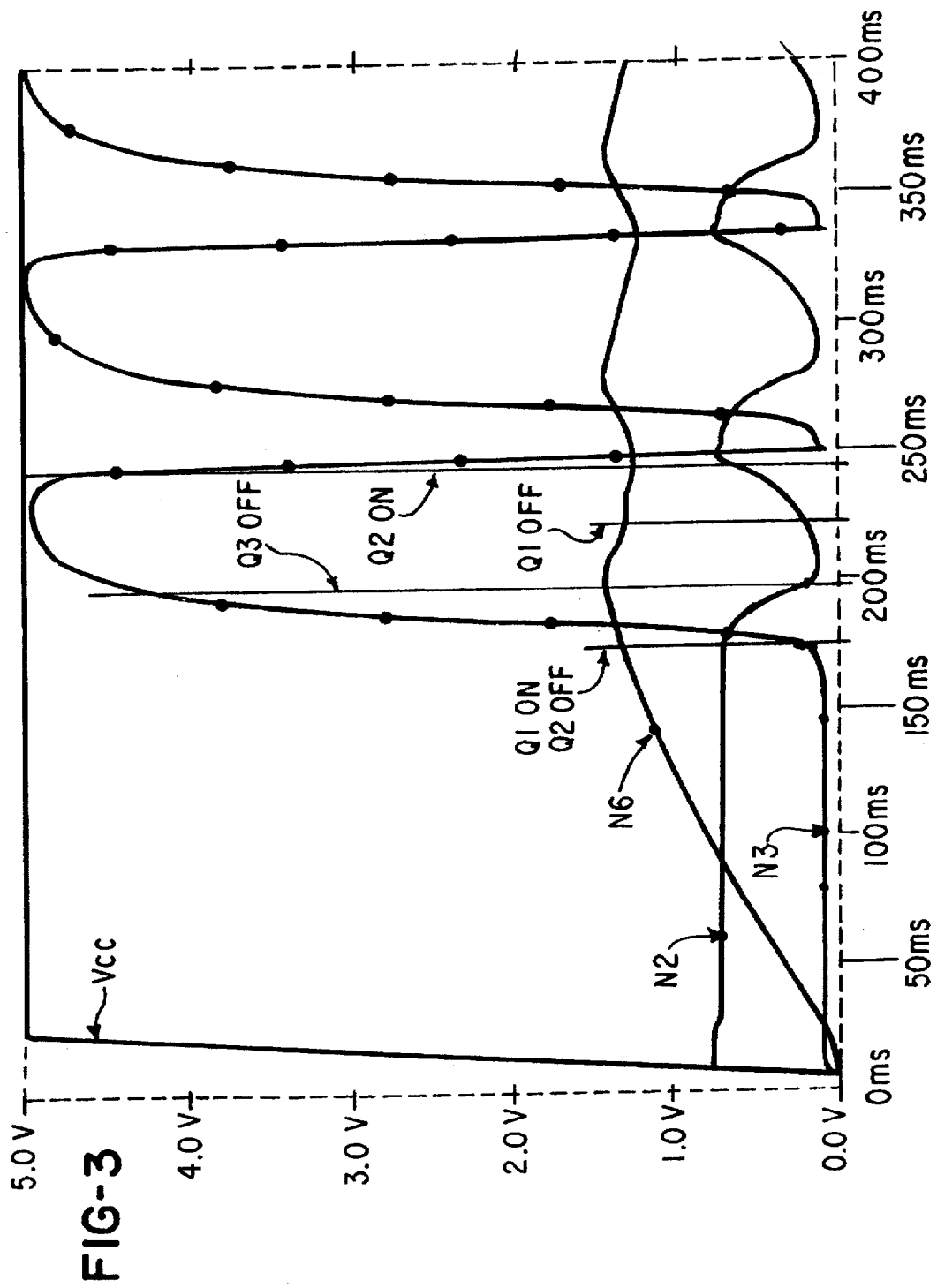
FIG. 3 is a timing diagram for the operation of the power-on-reset and watchdog circuit illustrated in FIG. 2.

Referring to FIG. 1, there is shown a block diagram of a power-on-reset and watchdog circuit 10 connected to a microprocessor 40. Circuit 10 includes a watchdog monitor circuit 30 and a reset enable circuit 20. Watchdog monitor circuit 30 generates a monitor signal during normal microprocessor operation and a monitor error signal during power up initialization or microprocessor malfunction. Reset enable circuit 20 generates a reset idle signal during normal microprocessor operation and a reset enable signal during power up initialization and/or microprocessor malfunction.

Microprocessor 40 has a reset line 50 and a watchdog output line 60. Microprocessor 40 receives either the reset idle signal or the reset enable signal, depending on the operational mode of microprocessor 40, via reset line 50. Microprocessor 40 generates a microprocessor standard signal during normal microprocessor operation and a microprocessor error signal during microprocessor malfunction, both of which are output on watchdog output line 60 and received by watchdog monitor circuit 30.

Watchdog monitor circuit 30 monitors the microprocessor standard signal on watchdog output line 60 to ensure that the microprocessor standard signal has a predetermined frequency. Reset enable circuit 20 remains inactive as long as the microprocessor standard signal is received by watchdog monitor 30, producing a reset idle signal. Microprocessor 40 will continue to operate without being reset as long as reset enable circuit 20 generates the reset idle signal.

During power-up initialization or microprocessor malfunction, microprocessor 40 generates the microprocessor error signal on watchdog output line 60. It should be noted that the microprocessor error signal can be either latched high or low. Either way, watchdog monitor circuit 30 generates a monitor error signal in response to the microprocessor error signal.

Upon receiving the monitor error signal, reset enable circuit 20 generates a reset enable signal on reset line 50. The microprocessor 40 receives the reset signal and resets microprocessor 40 in response thereto. Once microprocessor 40 is reset, microprocessor 40 may return to normal operation.

Referring now to FIG. 2, a power-on-reset and watchdog circuit 10 exists utilizing three bipolar junction transistors in combination with 7 resistors and 4 capacitors. Watchdog monitor circuit 30 is shown in dotted lines and described as follows. A first npn transistor Q1 is in a common-emitter configuration, with its emitter tied directly to ground and its base connected to ground through a first resistor R1. The base of transistor Q1 and resistor R1 are connected at a node N1. The collector of transistor Q1 is connected at a node N2 to a supply voltage (hereinafter Vcc) through the parallel combination of a second resistor R2 and a first capacitor C1.

Reset enable circuit 20 is shown in dotted lines and described as follows. A second npn transistor Q2 is in a common-emitter configuration, with its emitter tied directly to ground and its base tied to node N2. The collector of transistor Q2 is connected at a node N3 to Vcc through a third resistor R3, and to ground through a second capacitor C2. Notice that node N3 is connected directly to reset line 50 of the microprocessor 40 and to a base of a first pnp transistor Q3 (node N7) through a fourth resistor R4. The emitter of transistor Q3 is tied directly to Vcc, while the collector of transistor Q3 is tied at a node N5 to ground through a fifth resistor R5.

Node N5 is connected to a node N6 through a sixth resistor R6. Node N6 is tied to ground through a third capacitor C3 and to line 60 of microprocessor 40 through a seventh resistor R7 and a fourth capacitor C4. The operation of power-on-reset and watchdog circuit 10 will now be described as follows.

During normal operation, microprocessor 40 generates the microprocessor standard signal which periodically forward biases transistor Q1 at a rate sufficient to maintain capacitor C1 discharged through transistor Q1 to ground. With capacitor C1 discharged, the collector voltage of transistor Q1 (node N2) will remain low, which maintains transistor Q2 in the "off" state.

The "off" state of transistor Q2, in turn, causes the voltage at node N3 to remain high. Therefore, node N3 and reset line 50 of microprocessor 40 remain high, with the voltage approximately equal to the supply voltage at Vcc, as long as watchdog output line 60 provides the microprocessor standard signal to node N1. Microprocessor 40 will not reset as long as node N3 remains high.

Referring now to FIG. 2, upon system malfunction, microprocessor 40 stops generating the microprocessor standard signal on watchdog output line 60. Instead, microprocessor 40 generates the microprocessor error signal, which remains latched either high or low. In response to the microprocessor error signal, transistor Q1 remains off long enough for capacitor C1 to charge through R2 such that transistor Q2 turns on. As transistor Q2 turns on, capacitor C2 immediately discharges therethrough, forcing node N3 low. A low state at node N3 provides the reset enable signal on reset line 50 to reset microprocessor 40.

At this point, transistor Q1 is off which, as stated above, biases transistor Q2 on. The low voltage level at node N3 (due to transistor Q2 being on) causes transistor Q3 to turn on immediately. With transistor Q3 on, capacitor C3 then charges through resistor R6 until the voltage level across capacitor C3 biases transistor Q1 on.

Transistor Q2 will then turn off as transistor Q1 turns on, thereby allowing the voltage level at node N3 to go high again. Transistor Q3 remains on until capacitor C2 charges through resistors R3 and R4 to a voltage level approximately equal to the difference between the supply voltage and the diode voltage drop of transistor Q3.

When Q3 turns off, C3 discharges through R6 and R7 and transistor Q1 turns off. Transistor Q2 turns on at the point where capacitor C1 charges through resistor R2 to a voltage level approximately equal to the diode drop of transistor Q2. The voltage at node N3 decays immediately when transistor Q2 turns on, returning node N3 to the low state.

The aforementioned progression produces the reset enable signal having one pulse to reset line 50 of microprocessor 40. This progression repeats itself until a successful reset has been achieved at microprocessor 40. When reset has been achieved, microprocessor 40 resumes generating the microprocessor standard signal on watchdog output line 60, thereby causing reset enable circuit 20 to stop generating the reset enable signal and resume generating the reset idle signal. More specifically, transistor Q1 resumes being pulsed sufficiently into conduction so as to maintain transistor Q2 in the "off" state until another error requires the reset function to initiate.

In other words, the microprocessor error signal, the monitor error signal, and the reset enable signal all arise during the period between microprocessor malfunction and microprocessor reset.

Referring now to FIGS. 2 and 3, the operation of circuit 10 during power up initialization will be described. At the onset of initialization, microprocessor 40 produces the microprocessor standard signal on watchdog output line 60. However, to ensure proper operation of microprocessor 40, circuit 10 is designed to override the microprocessor standard signal to reset microprocessor 40 upon power up initialization by forcing node N3 low, thereby prompting the reset function detailed above.

Thus, upon the application of supply voltage Vcc to circuit 10, node N2 follows supply voltage Vcc as it ramps upward to a fully powered state. Node N2, however, is clamped by the base-emitter voltage (Vbe) of transistor Q2, thereby limiting the voltage at node N2 to approximately the diode drop voltage of transistor Q2. As such, transistor Q2 is turned on virtually immediately upon the application of supply voltage Vcc to circuit 10.

The on state of transistor Q2 causes node N3 to change from a zero voltage through resistors R3 and R4 to a voltage level limited by the collector-emitter saturation voltage (Vce sat) of transistor Q2, which is approximately 0.083 volts. This biasing of transistor Q2 effectively turns transistor Q3 on immediately upon the application of supply voltage Vcc to circuit 10. The on state of transistor Q3 causes node N6 to charge through resistor R6 in a ramped fashion until transistor Q3 turns off.

Transistor Q1 is off at the onset of power up initialization due to a lack of charge across capacitor C3, where the voltage level at node N6 is low. With transistor Q1 off, the voltage drop over resistor R2 maintains transistor Q2 on, thereby maintaining node N3 low. Node N3 will remain low until capacitor C3 charges through resistor R1 so as to turn transistor Q1 on.

Once transistor Q1 turns on, transistor Q2 immediately turns off. With transistor Q2 off, capacitor C2 charges through resistor R3, causing node N3 to ramp high toward supply voltage Vcc. This is the onset of one reset enable signal pulse to be supplied to reset line 50 of microprocessor 40. Transistor Q3 turns off when node N3 has reached a voltage level approximately equal to the difference between supply voltage Vcc and the diode drop voltage of transistor Q3.

Transistor Q1 turns off at the approximate point where the voltage at node N3 equals supply voltage Vcc. Transistor Q2 is then forward biased as capacitor C1 charges through resistor R2 to a voltage level approximately equal to the diode drop of transistor Q2. Node N3 then immediately decays from a high state to a low state, thereby completing one reset enable signal pulse to be supplied to reset line 50 of microprocessor 40.

The aforementioned progression repeats until microprocessor 40 resets and resumes producing the microprocessor standard signal on watchdog output line 60. The microprocessor standard signal on watchdog output line 60 turns on transistor Q1, thereby turning off transistor Q2 and Q3 to return node N3 to a high state. A high state at node N3 will disable the reset function until another error occurs.

In one embodiment, the various elements comprise the following values:

| Element | Value |
| --- | --- |
| C1 | 10 μF |
| C2 | 10 μF |
| C3 | 47 μF |
| C4 | .022 μF |
| R1 | 10K ohms |
| R2 | 10K ohms |
| R3 | 1K ohms |
| R4 | 10K ohms |
| R5 | 1K ohms |
| R6 | 10K ohms |
| R7 | 10K ohms |
| Q1 | Q2N3904 |
| Q2 | Q2N3904 |
| Q3 | Q2N3906 |

As such, the present invention provides a compact and low cost power-on-reset and watchdog circuit which is capable of resetting a microprocessor during power up initialization or if an error in microprocessor operation causes a malfunction in its proper operation.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A watchdog circuit for use in conjunction with a microprocessor having a reset input terminal and a watchdog output terminal comprising:
   a monitor circuit comprising passive elements, and no more than one transistor, which monitors the watchdog output terminal of the microprocessor and generates a monitor error signal in response to detecting a malfunction signal on the watchdog output terminal;
   a reset circuit having an input terminal and an output terminal, wherein
   (1) the output terminal is connected to the reset input terminal of the microprocessor
   (2) said reset circuit generates a reset signal on the output terminal of the reset circuit in response to receipt of the monitor error signal on the input terminal of the reset circuit, and
   (3) the input terminal of the reset circuit is different from the output terminal of the reset circuit.

2. The watchdog circuit as recited in claim 1 wherein said monitor circuit comprises a transistor having an RC circuit coupled to the base thereof.

3. The watchdog circuit as set forth in claim 1 wherein said reset circuit comprises no more than two transistors configured with a plurality of capacitors to facilitate generating said reset signal.

4. The watchdog circuit as recited in claim 1 wherein said monitor circuit and said reset circuit are configured to generate an initializing reset signal when said microprocessor is initialized.

5. A method for resetting a microprocessor having a reset input terminal and a watchdog output terminal, comprising the steps of:
   detecting a microprocessor error signal on the watchdog output terminal of the microprocessor and generating an oscillating monitor error signal in response thereto;
   detecting the oscillating monitor error signal at a first node and;
   generating a reset enable signal at a second node in response thereto, wherein
   (1) the second node is connected to the reset input terminal of the microprocessor, and
   (2) the first node is different from the second node.

6. The method as recited in claim 5 wherein the step of detecting the monitor error signal at a first node and generating a reset enable signal at a second node in response thereto further comprises the step of:
   providing a watchdog monitor circuit comprising at least one transistor and a reset enable circuit comprising no more than two transistors which are coupled to generate the reset enable signal in response to said microprocessor error signal.

7. The method as recited in claim 5 wherein said method further comprises the step of:
   generating said microprocessor error signal upon initialization of said microprocessor.

8. The method as recited in claim 5 wherein the step of detecting the monitor error signal at a first node and generating a reset enable signal at a second node in response thereto further comprises the steps of:
   reverse biasing one transistor in response to said microprocessor error signal; and
   forward biasing at least one other transistor.

9. A method of resetting a microprocessor having an input terminal and an output terminal, comprising the steps of:
   detecting a microprocessor error signal on the output terminal of the microprocessor with a watchdog monitor circuit and generating a monitor error signal in response thereto;
   detecting the monitor error signal on an input terminal of a reset enable circuit and generating a reset enable signal on an output terminal of the reset enable circuit in response thereto, wherein (1) the output terminal of the reset enable circuit is connected to the input terminal of the microprocessor, and (2) the input terminal of the reset enable circuit is different from the output terminal of the reset enable circuit.

10. The method of claim 9 further comprising the step of:
    generating the microprocessor error signal on the output terminal of the microprocessor when the microprocessor is initialized.

11. The method of claim 9, wherein the step of detecting the monitor error signal on an input terminal of a reset enable circuit and generating a reset enable signal on an output terminal of the reset enable circuit in response thereto includes the steps of:
    providing a uniform DC voltage to the reset enable circuit; and
    using the uniform DC voltage to generate the reset enable signal on the output terminal of the reset enable circuit.

12. The method of claim 11, wherein the uniform DC voltage is five (5) volts.

13. The watchdog circuit of claim 1, further comprising a uniform DC voltage source, wherein said reset circuit uses said uniform DC voltage source to generate the reset signal on the output terminal of said reset circuit.

14. The watchdog circuit of claim 13, wherein the uniform DC voltage source provides a constant five (5) volt signal to said reset circuit.

15. The method of claim 5, wherein the step of detecting the monitor error signal at a first node and generating a reset enable signal at a second node in response thereto includes the steps of:
    providing a uniform DC voltage; and using the uniform DC voltage to generate the reset enable signal at the second node.

16. The method of claim 15, wherein the uniform DC voltage is five (5) volts.

17. The watchdog circuit as recited in claim 3 wherein at least one of said plurality of transistors is coupled to said monitor circuit to permit said reset circuit to oscillate said monitor error signal.

18. The method as recited in claim 5 wherein the step of detecting the monitor error signal at a first node and generating a reset enable signal at a second node in response thereto comprises the step of:

oscillating said reset enable signal.

19. A circuit, comprising:
 a) a microprocessor having
  i) a reset input (50) and;
  ii) an error output (60), which outputs a pulse train in the absence of an error condition;
 b) an oscillator,
  i) comprising
   A) a transistor network for delivering an oscillating signal to said reset input (50);
   B) a monitor means which detects said pulse train and, in response, inhibits the transistor network from oscillating.

20. Circuit according to claim 19, wherein the oscillator is effective to produce said oscillating signal without an oscillating input.

21. Circuit according to claim 19, wherein the oscillator is effective to produce said oscillating signal when all signal inputs and all power inputs to the oscillator are of the DC type.

22. A circuit for applying pulses to a first pin (50) of a microprocessor, when the microprocessor ceases producing pulses at a second pin (60), comprising:
 a) three transistors; and
 b) circuit means, which includes resistors and capacitors, comprising
  i) nodes N1 and N2, connected to a first of said transistors;
  ii) nodes N2 and N3, connected to a second of said transistors;
  iii) nodes N5 and N7, connected to a third of said transistors;
  iv) a connection for applying signals at node N3 to said first pin (50); and
  v) a connection for applying signals at said second pin (60) to node N1, wherein a train of pulses is produced at node N3 when a train of pulses at node N1 terminates.

23. An electronic circuit, comprising:
 a) a microprocessor (40), having a reset input (50) and an error output (60);
 b) a monitoring-and-reset circuit, consisting essentially of the following:
  i) a power line and a ground line;
  ii) a first resistor (R1) connecting between a node N1 and the ground line;
  iii) a first NPN transistor (Q1), having
   A) its base connected to the node N1;
   B) its collector connected to a node N2;
   C) its emitter connected to the around line;
  iv) a parallel RC network (R2, C1), connecting between the node N2 and the power line;
  v) a second NPN transistor (Q2), having
   A) its base connected to the node N2;
   B) its collector connected to a node N3;
   C) its emitter connected to the ground line;
  vi) a third resistor (R3) connecting between the node N3 and the power line;
  vii) a second capacitor (C2) connecting between the node N3 and the ground line;
  viii) a fourth resistor (R4) connecting between the node N3 and a node N7;
  ix) a PNP transistor (Q3), having
   A) its base connected to the node N7;
   B) its collector connected to a node N5;
   C) its emitter connected to the power line;
  x) a fifth resistor (R5), connecting between the node N5 and the ground line;
  xi) a sixth resistor (R6), connecting between the node N5 and a node N6;
  xii) a third capacitor (C3), connecting between the node N6 and the ground line;
  xiii) a seventh resistor (R7), connecting between the node N6 and the node N1;
  xiv) a fourth capacitor (C4), connecting between the node N1 and the error output (60); and
  xv) a line connecting between node N3 and the reset input (50), wherein node N3 delivers an oscillating signal to the reset input (50) in the absence of a pulse train at the error output (60), and wherein node N3 delivers a DC signal to the reset input (50) when a pulse train exists at the error output (60).

* * * * *